(No Model.)
H. H. GRENFELL.
LUMINOUS SIGHT FOR FIRE ARMS.
No. 399,144. Patented Mar. 5, 1889.
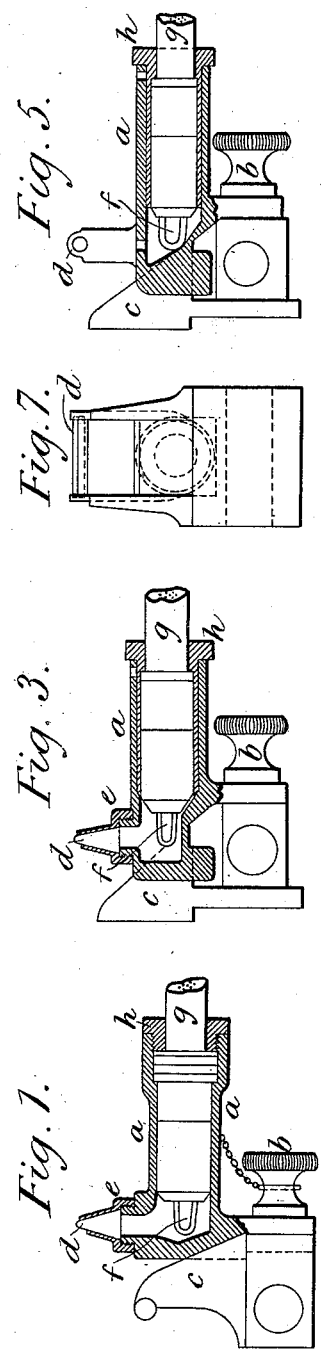
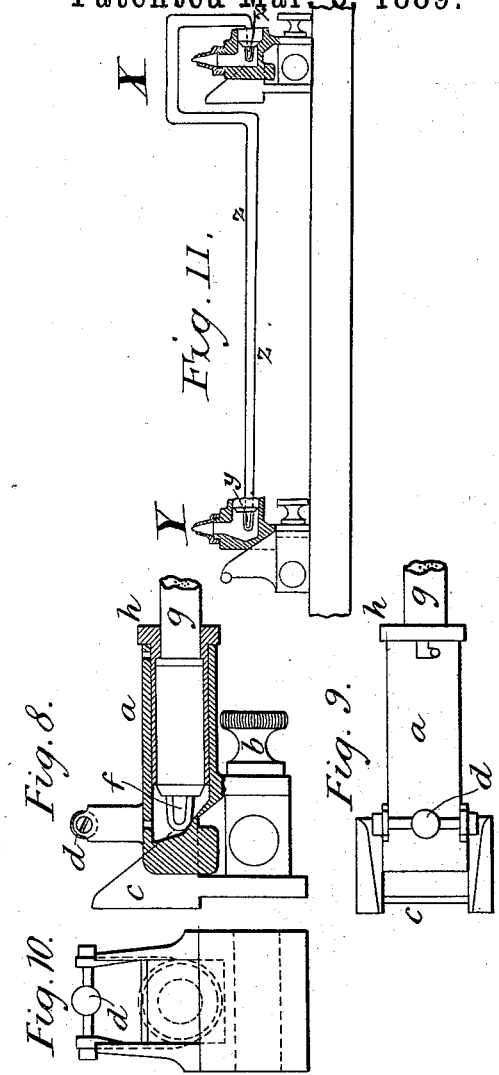
Witnesses
Inventor
Hubert Henry Grenfell

UNITED STATES PATENT OFFICE.

HUBERT H. GRENFELL, OF NEWCASTLE-UPON-TYNE, COUNTY OF NORTHUMBERLAND, ENGLAND, ASSIGNOR TO W. G. ARMSTRONG, MITCHELL & CO., (LIMITED,) OF SAME PLACE.

LUMINOUS SIGHT FOR FIRE-ARMS.

SPECIFICATION forming part of Letters Patent No. 399,144, dated March 5, 1889.

Application filed October 22, 1888. Serial No. 288,842. (No model.) Patented in England April 2, 1886, No. 4,653.

*To all whom it may concern:*

Be it known that I, HUBERT HENRY GRENFELL, captain R. N., a subject of the Queen of Great Britain, residing at Elswick Works, Newcastle-upon-Tyne, in the county of Northumberland, England, have invented certain new and useful Improvements in Appliances for Directing the Discharge of Ordnance and other Weapons of War at Night, (for which I have received Letters Patent in Great Britain, No. 4,653, dated April 2, 1886,) of which the following is a specification.

The object of this invention is to provide an illuminated trunnion and breech-sight which permits of the more accurate firing of ordnance at night. The same is also applied to gun and torpedo directors, &c., for the more accurate directing of guns, torpedoes, and other weapons of war.

The sight consists of a fitting or socket piece clamped or otherwise readily fixed to the ordinary day-sight. In the socket-piece a small piece of glass or other transparent substance of any desired color is set so as partly to project. Inside the socket-piece a small electric lamp is placed. The light passing out through the transparent substance causes it to glow or to show a luminous point, which serves as a sight.

It is sometimes preferred that the transparent substance forming the sight should be colored, in order that in aiming the sight-point may be readily distinguishable from a light which may form the object on which the gun is to be laid. Preferably the fore and rear sights are differently colored.

The lamp is made portable by means of a special tube made to slide into the fitting, so that should a light be required to adjust the sights this lamp can be used. The lamp and pieces of glass or other suitable substance are perfectly protected, the one by the case containing it and the other by a hood specially arranged for the purpose. This hood can be used as an ordinary day-sight, so that it is not necessary to unship any part of the sight for day use. The conducting-wires to the lamps are led from any convenient place where the battery may be fixed. The wires are so arranged that the outer part of the cable takes any strains which may be put on them, and the conducting copper wires remain uninjured. Fittings are similarly arranged for gun and torpedo directors, by which their sights are illumined.

In order that the said invention may be fully understood and readily carried into effect, I will proceed to describe the drawings hereunto annexed.

In the accompanying drawings, Figure 1 is a vertical section, and Fig. 2 is a plan, of a fore sight constructed in accordance with my invention. Fig. 3 is a section, and Fig. 4 is a plan of a breech or rear sight constructed in accordance with my invention. Figs. 5, 6, and 7 show the breech or rear sight in a modified form, in which the sight-piece is of a cylindrical form. Figs. 8, 9, and 10 show a further modification in which the sight-piece is globular; and Fig. 11 is a diagram view showing the position of the front and rear sights and the circuit-connections of the electric lamps.

$a$ is a fitting or socket piece, which fits on to the day-sight and is clamped to it by means of a small screw, $b$, or in any other simple way admitting of its being readily removed. $c$ is the day-sight. $d$ is a piece of glass set in the socket-piece and retained in place by a cap, $e$. $f$ is an electric lamp inserted into the socket-piece. $g$ is a cable containing conducting-wires by which current is supplied to the lamp. $h$ is a ring surrounding the cable $g$ and screwing into or engaging by a bayonet-joint with the socket-piece to retain the lamp in place. The electric lamp is preferably made as an ordinary incandescent lamp, but of very small size; it may, however, be simply a coil of platinum or other wire heated by the current.

In Figs. 1 to 4 the transparent sight-piece $d$ is represented as conical at the upper part and flat on the under side, which is exposed to the lamp. This is the form preferred especially for the fore sight, but it is not essential. The sights for gun and torpedo directors are in all respects similar.

In Figs. 5, 6, and 7 the transparent sight-piece $d$ is cylindrical in form. It shows a line of light which may be formed into a scale by opaque lines upon the surface of the glass.

In Figs. 8, 9, and 10 the transparent sight-piece $d$ is globular.

In Fig. 11, X indicates the rear sight; Y, the front sight; $x$ and $y$, the electric lamps, and $z$ the circuit-connections.

I claim—

1. The combination, substantially as hereinbefore set forth, of the sight-piece, the luminous body below the sight-piece, and the case hiding the luminous body from view, but having an opening at the top through which light is transmitted to the sight-piece.

2. The combination, substantially as hereinbefore set forth, of the transparent sight-piece, the luminous body, and the case hiding the luminous body from view, but having an opening through which light is transmitted to the sight-piece.

3. The combination, substantially as hereinbefore set forth, of the transparent sight-piece, the socket-piece in which it is mounted, the electric lamp and the case hiding the electric lamp from view, but having an opening through which light is transmitted to the sight-piece, and the circuit-connections of the electric lamp supported in the socket-piece.

4. The combination, substantially as hereinbefore set forth, of the transparent sight-piece, the socket-piece or support in which it is mounted, the electric lamp contained within the socket-piece incased thereby and hidden from view, but having an opening through which light is transmitted to the sight-piece, and the clamp for removably securing the socket-piece to a gun.

5. The combination, substantially as hereinbefore set forth, of the transparent sight-piece, the socket-piece or support on which it is mounted, and the electric lamp and its circuit-connections removably secured to the socket-piece.

6. The combination, substantially as hereinbefore set forth, of the front and rear night-sights for guns, each consisting of a transparent sight-piece, a luminous body, and a case hiding the luminous body from view, but having an opening through which light is transmitted to the transparent sight-piece.

H. H. GRENFELL.

Witnesses:
 THOS. COLLIN,
 PAUL ROBERTS.